United States Patent [19]

Adler et al.

[11] 4,321,508

[45] Mar. 23, 1982

[54] LOAD CONTROL AND SWITCHING CIRCUITS AND REMOTE/LOCAL CONTROL SYSTEMS USING SUCH CIRCUITS

[75] Inventors: Michael S. Adler, Schenectady, N.Y.; Paul G. Huber, Pawtucket, R.I.

[73] Assignee: General Electric Company, Schenectady, N.Y.

[21] Appl. No.: 181,812

[22] Filed: Aug. 27, 1980

[51] Int. Cl.$^3$ .................... H05B 39/04; G05F 3/04
[52] U.S. Cl. .............................. 315/291; 307/252 B; 315/199; 323/324; 340/310 A
[58] Field of Search ............ 323/239, 242, 300, 320, 323/322, 324, 325, 326; 364/493; 315/315, 321, 194, 199, 291; 307/38, 40, 252 B; 340/310 A

[56] References Cited

U.S. PATENT DOCUMENTS

| | | | |
|---|---|---|---|
| 4,095,139 | 6/1978 | Symonds et al. | 315/315 |
| 4,167,786 | 9/1979 | Miller et al. | 364/493 |
| 4,173,754 | 11/1979 | Feiker | 340/310 R |
| 4,185,272 | 1/1980 | Feiker | 340/168 R |
| 4,200,862 | 4/1980 | Campbell et al. | 340/310 A |
| 4,213,182 | 7/1980 | Eichelberger et al. | 364/493 |
| 4,215,276 | 7/1980 | Janeway | 307/40 |
| 4,221,978 | 9/1980 | Smith et al. | 307/252 B |

Primary Examiner—William H. Beha, Jr.
Attorney, Agent, or Firm—Geoffrey H. Krauss; James C. Davis, Jr.; Marvin Snyder

[57] ABSTRACT

Apparatus facilitating the switching and control of the power consumption level of at least one power-consuming load remotely located from a central facility. Load switching and power-consumption control commands are sent from the central facility to each of the remote locations to provide an analog signal having a programmable amplitude or programmable pulse-width thereof to an intelligent load control and switching circuit. The load control and switching circuit not only controls the coupling of a power source to a power-consuming load, but also controls the portion of the source waveform cycle during which the load is coupled to the source, to control the average power consumption thereof. Several embodiments of load control and switching circuitry, as well as power supplies for providing operating potential thereto, are disclosed.

17 Claims, 6 Drawing Figures

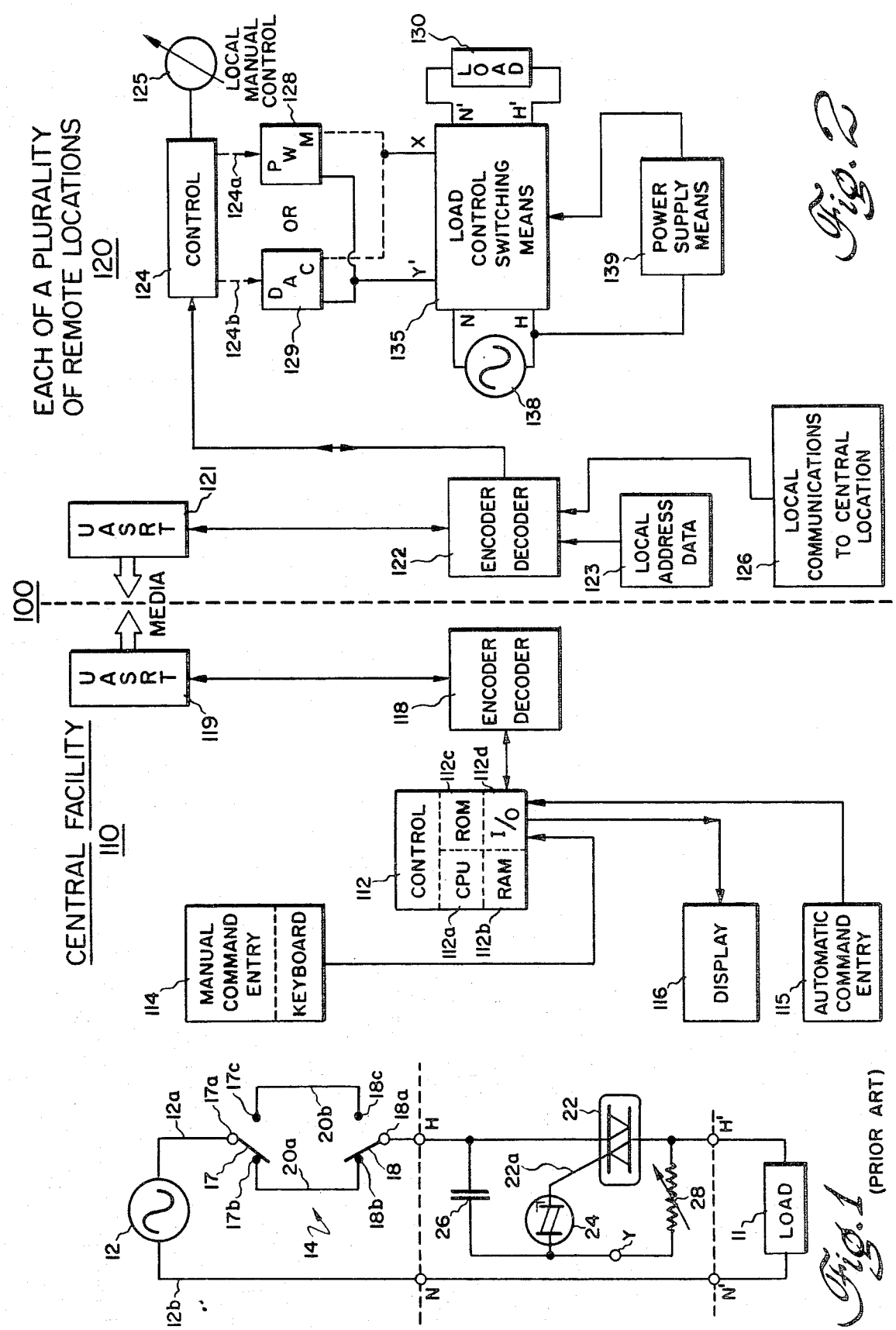

LOAD CONTROL AND SWITCHING CIRCUITS AND REMOTE/LOCAL CONTROL SYSTEMS USING SUCH CIRCUITS

BACKGROUND OF THE INVENTION

The present invention relates to load control and switching apparatus and, more particularly, to a novel system for remotely controlling the presence and amplitude of power consumed by a load, which power consumption may be remotely programmed from a central location to all of a plurality of remote locations, and of power load control and switching means and power supplies for use therewith.

It is desirable to actuate each of a plurality of power-consuming loads, and to set the power-consumption level thereof, from a central control facility. Switching and control of the power-consuming loads are advantageously commanded both manually and on a programmed basis. Further, a system allowing such load activation and level control will advantageously provide a common transmission medium between the central facility and all of the plurality of remote locations, to reduce cost of the system. For example, all of the lights in a residence may be controlled by a central facility allowing the light level in each room of the residence to be adjusted on a time-of-day schedule, while further providing for manual intervention from specific locations (such as at the house entrance or in the master bedroom) for controlling all light sources within that residence.

Heretofore, individual wiring, between remote switches and each load to be energized and level controlled, was commonly utilized. More recently, centrally-programmable load switching systems have been utilized for the purpose of enabling and disabling current flow through a particular load; active control of the power consumption of a single load has not been hitherto possible in programmable, central-control systems. Accordingly, such a system, as well as load control and switching means for use therein and power supplies for providing operating potential to such control and switching means, are highly desirable.

BRIEF SUMMARY OF THE INVENTION

In accordance with the invention, a system for switching and controlling power consumption in each of a plurality of loads remotely located from a central facility, includes a control computer having facilities for storing commands manually or automatically entered therein and for displaying the results thereof, as well as an encoder-decoder communicating between the control computer and a similar encoder-decoder at each of a plurality of remote locations at which is located a power-consuming load which is to be programmably switched and controlled. The decoded programming information, as received at each of the remote locations, is utilized to control either the pulse-width of an analog pulse-width-modulated signal, or the amplitude of an analog D.C. voltage control signal, either of which pulse-width-modulated or variable-amplitude signals is furnished at the input to a load control and switching means. The load control switching means couples a power source to a power-consuming load for a programmable portion of the power source waveform and is programmably responsive to the pulse-width-modulated or variable-amplitude control signals.

In one presently preferred embodiment, the load control and switching means utilizes a gateable, bidirectionally-conductive device for switching and level control, and an asymmetrically-conductive device is utilized to gate the load-current-control element, responsive to the control signal developed responsive to the commands received from a central facility.

Power supplies for providing operating potential, as required, to one embodiment of the load control and switching means are described and claimed in copending application Ser. No. 181,813 filed on even date herewith, assigned to the assignee of the present application and incorporated herein by reference.

Accordingly, it is one object of the present invention to provide a novel system for programmably switching and controlling the power-consumption of each of a plurality of loads remotely located from a central facility.

It is another object of the present invention to provide novel means for switching and controlling the current flow in the power-consuming loads, responsive to signals programmably controlled from the central facility or the remote location.

These and other objects of the present invention will become apparent to those skilled in the art upon consideration of the following detailed description, when taken in conjunction with the drawings.

BRIEF DESCRIPTION OF THE DRAWINGS

FIG. 1 is a schematic diagram of a prior art means for switchable connecting a power-consuming load to a power source, and other prior art means for manually controlling the power-consumption level of the load;

FIG. 2 is a block diagram of a programmable load control and switching system, in accordance with the principles of the present invention;

DETAILED DESCRIPTION OF THE INVENTION

Figure 2A:
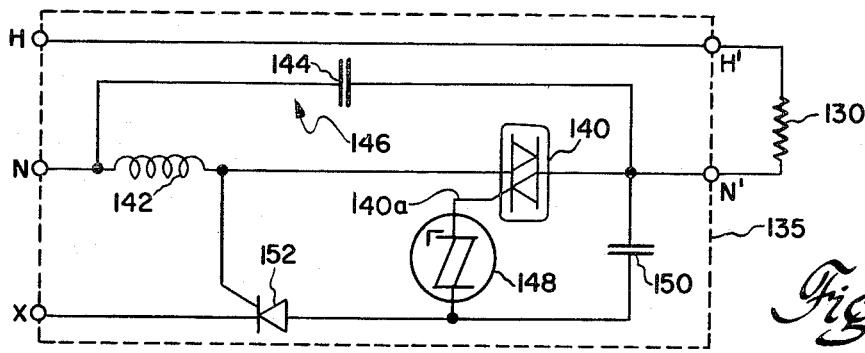
FIGS. 2a and 2b are schematic diagrams of presently preferred embodiments of load control and switching means usable in the system of FIG. 2.

Referring initially to FIG. 1, a prior art load control circuit 10, for controlling the magnitude of average power applied to a load 11 from a sinusoidal power source 12, comprises a power switching section 14 and a power magnitude control section 15 in series electrical connection in the hot line 12a from the source to the hot line connection H' of the load. The neutral terminal 12b of the source is connected via neutral wire N directly to the neutral connection of the load. Power control section 14, as is well-known in the art, may consist of a single-pole, single-throw switch if load control from a single location is desired. Where power switching from each of a pair of central locations is desired, a pair of single-pole, double-throw switch means 17 and 18 (as illustrated) are used. The switch means each have a common terminal 17a and 18a, respectively connected to the hot line 12a from the source and to the hot line input H of the magnitude control section 15. Like switch contacts 17b and 18b or 17c and 18c are connected together by intermediate wire 20a and 20b, respectively, to allow connection of the source hot line 12a to the hot input H of the power control unit for switching power from each of the pair of locations. Other well-known schemes may be used for allowing power to be switched, from a plurality of locations, between a source and a load. Average power magnitude control section 15 includes a gateable device 22, such as a triac and the like, having a controlled main circuit in series with the line and conducting responsive to the signal at a gate control electrode 22a thereof. Typically, a four-layer triggering device 24 is connected between gate electrode 22a and the control point Y of a variable-phase-shift network, including a capacitance element 26 and a variable resistance 28. The remaining terminals of device 22 are respectively connected to the hot line input H and the hot line output H' of the magnitude control means 15. As is well-known, adjustment of the magnitude of variable resistance 28 changes the phase angle of the A.C. waveform at triggering device 24, causing device 24 to conduct at an adjustable time, in each cycle, after a zero crossing of the source waveform. When device 24 conducts, a gating signal is applied to the gate electrode 22a of the series device 22, allowing current to be drawn by the load during a variable portion of the sinusoidal waveform of the power supply, thus varying the average current, and power, drawn by load 11. It will be seen that the load power magnitude may be adjusted from only one physical location (that location at which variable resistance 28 is located) even if the power switching arrangements of section 14 are replaced by remote-control apparatus of either manually or automatically actuated type. It is therefore desirable to be able to control the average power magnitude of the load independently from more than one location, as required in a multi-location power control system. It is also desirable to provide a load power magnitude control unit capable of external control.

One presently preferred embodiment of a system 100 for controlling load power, for example, to dim the luminous output of a plurality of incandescent lighting sources, from, and at, each of a multiplicity of locations, is shown in FIG. 2. The system comprises a central facility 110, at which is located a control computer 112. Computer 112 includes a central processing unit 112a interconnected with random-access memory (RAM) 112b and read-only memory (ROM) 112c, of sufficient storage space for storing data and addresses of a desired plurality of remote loads, and an input-output section (I/O) 112d. The I/O section allows a manual command entry keyboard 114 and an automatic command entry means 115 (which may be tape, disc, and the like mass storage means) to provide information to the control computer means, and to provide data to a display means 116. A digital encoder and decoder means 118 is connected for two-way communication with I/O section 112. The distinct address of each of the plurality of remote locations, as well as the data to be transmitted thereto, is received from the I/O section and encoded into the particular transmission format utilized by encoder-decoder means 118. The encoded data is then provided to a universal asynchronous-synchronous receiver transmitter means (UASRT) 119, for communication via a selected transmission media to all of the plurality of remote locations. Similarly, encoded data from a remote location is received by UASRT 119, from the transmission media, and is provided to encoder-decoder means 118 for decoding, and subsequent presentation to the I/O section 112d of the central control computer means 112.

At each of a plurality of remote locations 120, a universal asynchronous-synchronous receiver transmitter means (UASRT) 121 receives the encoded address and data transmission from the media and provides the received transmission to an encoder-decoder means 122. The incoming transmission is decoded and the address portion of the transmission is checked against local address data stored in local address data means 123 (which may be a switch matrix, read-only memory or the like apparatus). If the local address data corresponds to the address sent as part of a particular transmission, decoder means 122 provides the data portion of that transmission to a control means 124. Similarly, data from each local control means 124, which data may be modified by an associated local manual control means 125 for varying the magnitude of power applied to a local load 130, is provided to encoder-decoder means 122, in addition to local address data from local address data means 123 and communications data provided by a local communications-to-central-location means 126. The local address data (supplied by means 123) and any additional data supplied by one or both of local manual control means 125 or local communications means 126, is encoded in means 122 and provided to UASRT 121. The encoded address and data transmission is then sent via the transmission media to central facility 110. At the central facility, UASRT 119 provides the incoming data to encoder-decoder means 118 for subsequent presentation to the control computer means 112, as previously described hereinabove. It should be understood that the heretofore described portions of the load power control system may be provided by systems such as are described and claimed in U.S. Pat. Nos. 4,167,786, issued Sept. 11, 1979; 4,173,754, issued Nov. 6, 1979; 4,185,272, issued Jan. 2, 1980; or 4,213,182, issued July 15, 1980, all of which patents are incorporated herein in their entirety by reference. Accordingly, it should be understood that any system having a central facility providing each of a plurality of remote locations with data sufficient to provide each unique-local-address remote location with a control data output at the outputs of control means 124, is equally as well utilizable for that portion of the system shown in FIG. 2.

Connected to one of outputs 124a or 124b of control means 124 is a means, such as a pulse-width modulator (PWM) 128 or a digital-to-analog converter (DAC) 129 receiving the digital data, recovered from the transmission to the particular local address of that one of the plurality of remote locations, for conversion to a level-setting analog voltage. Thus, the digital data, available at that one of control outputs 127a or 127b utilized, preferably establishes the value a parameter of the output of that one of PWM means 128 or DAC means 129 utilized, whereby a signal is received at a control input X of a load control switching means 135, which signal has a programmable parameter, for example, programmable pulse-width in a fixed pulse-repetition-interval (if PWM means 128 is utilized) or programmable amplitude of a D.C. voltage (if DAC means 129 is utilized). The programmably-established parameter of the control voltage at switching means input X establishes the duration of the conduction time during each half-cycle of the waveform of A.C. power source 138. Load control means 135 may receive operating potential from a power supply means 139, preferably connected across the control means, i.e. effectively in series connection with load 130.

In a remote lamp dimming embodiment of system 100, the "smart" or intelligent switch means 135 performs both the "on-off" switching function and a "dimming" function.

The load switching means 135 requires a switching device which will withstand and block both polarities of the A.C. line voltage, to peak amplitudes on the order of ±200 volts. This gateable device must also be a symmetrical switch, such as a triac and the like, which will pass both polarities of current; the gating circuit for this device will advantageously respond to a single polarity, low voltage signal (on the order of 5 volts peak, such as is obtained from digital logic). Further, it is advantageous to be able to turn the switching means "off", as well as "on", at any time during either polarity half-cycle of the source waveform, rather than utilizing the zero voltage crossing of the source waveform to place the gateable device in the nonconductive condition. The load current switching means 135 and 135', of FIGS. 2a and 2b, respectively, allow remote control of the on/off function and load power control function of a gateable device 140, responsive to single-polarity digital control signals which may be provided and/or commanded from a remote location.

Each of the power controlling means 135 and 135' utilizes a gateable device 140 having a gating electrode 140a. The anode-cathode circuit of device 140 is placed in series with an inductance 142, between the source neutral N input connection and the controlled load neutral N' connection of the current controller means. In the illustrated embodiments, the source hot line connection H is connected directly to load hot line connection H', although it should be understood that the connections may be reversed such that inductance 142 and device 140 are in series between terminals H and H', with terminals N and N' being directly connected. A capacitor 144 is connected between source neutral connection N and load neutral connection N'; inductance 142 and capacitance 144 comprise a radio-frequency-interference filter 146. A diac or similar triggering device 148 is connected between gateable device gating electrode 140a and one terminal of a capacitance element 150, having its other terminal connected to the load neutral terminal N'.

In the embodiment of FIG. 2a, the anode of a silicon-control rectifier (SCR) 152 is connected to the junction between triggering device 148 and capacitance 150, while the cathode of SCR 152 is connected to a control input X. The gate electrode of SCR 152 is connected to the junction between inductance 142 and gateable device 140. It will be seen that the SCR is connected in a common-gate, cathode-driven configuration. An electrically symmetrical switch is achieved which is controlled by a single-polarity voltage at control input X.

In operation, a logic voltage of negative polarity is applied by one of PWM means 138 or DAC means 129 to control input X, with respect to source neutral terminal N (which may be considered a virtual ground). When the voltage at control input X achieves a sufficiently negative amplitude SCR 152 fires, allowing capacitance 150 to charge and change the voltage present at trigger device 148. When a sufficiently large magnitude of voltage is presented to trigger device 148, gating electrode 140a receives a gating pulse and switches gateable device 140 into the conducting condition, whereby current flows through load 130. Conversely, when the voltage at control input X falls to about zero volts, SCR 152 is turned off and device 148 turns off gateable device 140. Thus, the magnitude of an analog control voltage establishes the load on/off condition, as well as the load current in the on condition.

It is, however, preferable that the SCR be driven in the voltage-chopper-mode by providing a signal from PWM means 128 to control input X. By varying the duty cycle of the pulse-width-modulated signal, the percentage of time that the SCR is in a conducting condition will be made to vary, to proportionally vary the average current supplied to capacitor 150. By controlling the voltage across capacitor 150, the time and phase angle at which the gateable device is triggered is controlled, and thus controls the average load current. As load power is directly related to PWM duty cycle, use of a PWM input signal allows setting of absolute powerline. The pulse-width-modulated signal may have a repetition frequency at least one order (and preferably two or more orders) of magnitude greater than the power source frequency, whereby the PWM signal does not have to be synchronized with the power frequency signal. The SCR is switched between the "on" and "cutoff" conditions, to minimize heat dissipation. If dV is the trigger element threshold voltage, I is SCR saturation current and C is the capacitance of capacitor 148, then the conduction time $dt = dV(C/I)$ needed to trigger gateable device 140 (the triac) is calculable. Use of a PWM means with minimum "on" pulse width much less than conduction time dt allows a smooth power transfer curve to be obtained.

Figure 2B:
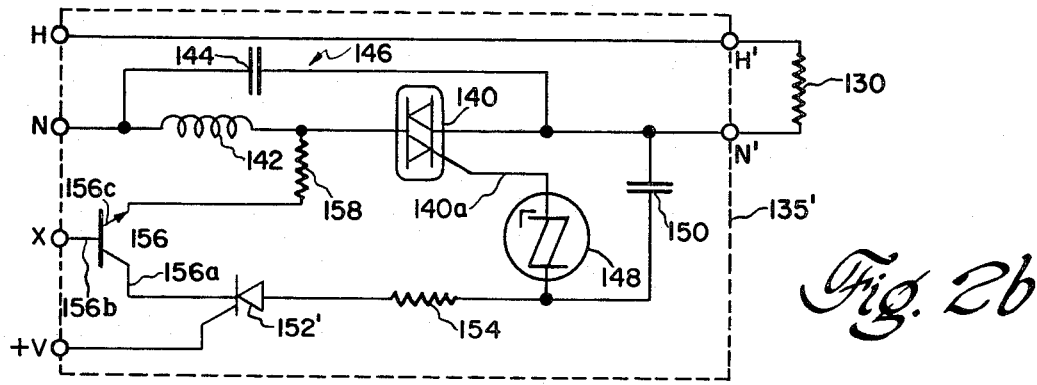

In FIG. 2b, the junction between trigger device 148 and capacitor 150 is connected to the anode of an SCR 152' through a current-limiting resistance element 154. The gate electrode of the SCR is connected to a positive polarity D.C. potential, of magnitude $+V$ volts. The cathode electrode of SCR 152' is connected to the collector electrode 156a of a NPN transistor 156. The base electrode 156b of the transistor is connected to control input X, while the emitter electrode 156c thereof is connected through a resistance element 158 to the junction between inductance 142 and gateable device 140. This embodiment is especially useful with logic circuitry utilizing only a single-ended positive voltage power supply for providing the operating potential thereto. By connecting the SCR gate to a positive voltage $+V$, the control input X is floated with respect to the logic circuitry operating potential. As the logic power supply will typically present a low impedance to alternating current, charging of capacitance 150 is not substantially affected. Thus, by providing a positive control signal at control input X, with respect to the virtual ground at source neutral terminal N, transistor 156 can be turned on at any time during either of the source waveform half-cycles, to trigger SCR 152' and allow the SCR to pass A.C. current through resistance 154, to charge capacitance 150. When sufficient charging of capacitance 150 has occurred, gateable device 140 is triggered and load current conduction commences. Advantageously, transistor 156, and its associated emitter resistance 158, provide a current gain which enables digital logic of PMOS type to provide a sufficiently large actuating current for SCR 152'. Further, resistance element 154 is selected to limit the current passing through SCR 152' to prevent the SCR from latching-up in the conductive state.

It should also be understood that the embodiments of FIGS. 2a and 2b may be utilized as a simple on-off power switching circuit, if the input signal, at control input X, is restricted to: a first level selected to maintain the gateable device in the nonconductive, or "off" condition; and a second level selected to be sufficiently high enough to assure that the gateable element will remain in the conductive, or "on", condition for substantially all of each source waveform half-cycle. Thus, any remotely-controlled power switching function, such as appliance outlet switching and the like, can be provided, as well as providing a variable load current amplitude when the current is switched "on". By remotely controlling both the on/off function and load power levels, preferably over a shared communications link, which may be a twisted wire pair, a coaxial cable, a powerline carrier, radio or optical link and the like, some or all of the electrical power consumption loads in a building and the like can be controlled for greater convenience and economy.

Figure 3A:
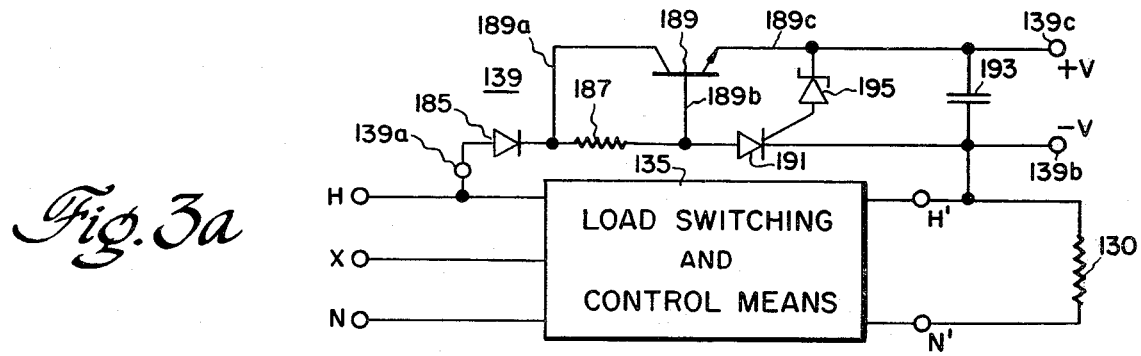
FIGS. 3a and 3b are schematic diagrams of power supplies for supplying operating potential to the load control and switching means of FIG. 2b.

As previously set forth hereinabove, a power supply 139 (see FIG. 2) for supplying an operating potential (such as positive polarity operating potential +V of FIG. 2b) is preferably in effective series-connection with the load. Accordingly, standard transformer techniques cannot be used nor can resistive or capacitive voltage-dropping techniques be utilized to provide the control means operating potential from the relatively high-voltage A.C. source 138, due to the undesirable heat generation and/or physical bulk required. Suitable power supplies are described and claimed in copending application Ser. No. 181,813 filed on even date herewith, assigned to the assignee of the present application and incorporated herein by reference. A first embodiment of power supply 139 is illustrated in FIG. 3a. Power supply input 139a is connected to source hot line terminal H and power supply output common terminal 139b is connected to the load hot line output H' of the load control means 135. Input 139a is connected to the anode of a series-pass diode 185, having its cathode connected to a first terminal of a resistor 187 and to the collector electrode 189a of a series-pass transistor 189. The series-pass transistor base electrode 189b is connected to the remaining terminal of resistor 187, as is the anode of a silicon-controlled rectifier (SCR) 191. The SCR cathode is connected to power supply output common terminal 139b, as is one terminal of an output filter capacitance 193. The remaining terminal of capacitance 193 and the series-pass transistor emitter electrode 189c are connected to the power supply positive potential output 139c. The gate electrode of SCR 191 is connected to the anode of a zener diode 195, having its cathode connected to supply output terminal 139c.

In operation, at the start of each positive half-cycle of the source waveform, the gateable device 140, in load control and switching means 135', is initially nonconducting, whereby the instantaneous source voltage appears between load control and switching means hot line input H and load control and switching means hot line output H', and therefore between the power supply input 139a and power supply output common 139b. Diode 185 is forward biased. Resistance 187 is selected to cause transistor 189 to saturate, causing a current to flow into and rapidly charge output capacitor 193. Typically, capacitor 193 is charged to the voltage level required for the operating potential source (a magnitude of +V) for load control and switching means 135, with the charging taking place in 1 millisecond for a 60 Hz source waveform. The zener voltage of zener diode 195 is chosen to provide a firing signal to the gate electrode of SCR 191 when the voltage across capacitance 193 reaches the desired power supply output potential V.

Upon firing, SCR 191 turns off transistor 189, causing cessation of current flow into capacitance 193. At the zero crossing between the positive and negative half-cycle of the source A.C. waveform, the SCR is reset. Diode 185 is reversed-biased during the negative polarity half-cycle of the source waveform, whereby power supply 139 operates only during each positive polarity source waveform half-cycle. Thus, the desired operating potential V is provided by a power supply having a very low duty-cycle, which allows almost all of the source power to be available to the control load 130. The power supply utilizes a relatively low power transistor which, being switched from fully saturated to fully cut-off, dissipates relatively little energy and produces relatively little heat. It should be understood that a negative operating potential may be equally as well supplied by power supply means 139, by the appropriate reversal of polarity of diodes 185 and 195, transistor 189 and SCR 191, such that the output capacitance is charged during the negative polarity source waveform half-cycle.

Figure 3B:
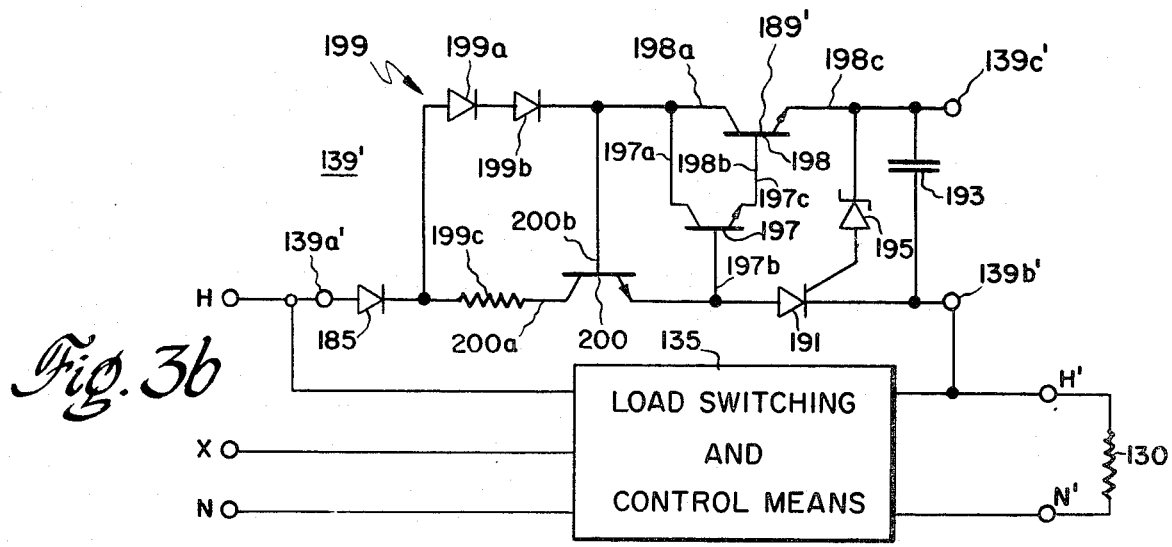

The power supply circuit of FIG. 3a is satisfactory for energizing operating loads having a power drain of less than about ¼ watt. In some embodiments of load control and switching means 135', a positive operating potential of about 8 volts, at an operating current of about 70 milliampes (or a power level of approximately ½ watt) is required. A medium-output-power-level power supply 139' is illustrated in FIG. 3b. Power supply input 139a' is connected to source hot line terminal H, while power supply output common connection 139b' is connected to controlled hotline output H'. Input diode 185, SCR 191, output capacitance 193 and zener diode 195 are connected as in the low-power-level power supply 139 of FIG. 3a. Due to the greater power level involved, series-pass transistor 189 is replaced by a series-pass Darlington transistor arrangement 189', having first and second transistors 197 and 198, respectively. The saturation resistance 187 is replaced by a current source 199 having a first diode 199a having its anode connected to the cathode of diode 185 and having its cathode connected to the anode of a second diode 199b. The cathode of diode 199b is connected to the parallel-connected collector electrodes 197a and 198a of transistors 197 and 198. One terminal of a resistance 199c is connected to the cathode of diode 185 and to the emitter electrode 200a of a PNP transistor 200. The base electrode 200b of current-source transistor 200 is connected to the junction between the cathode of diode 199b and collector electrodes 197a and 198a. The current-source transistor collector electrode 200c is connected to the anode of SCR 191 and to the base electrode 197b of transistor 197. The emitter electrode 197c of the first transistor in Darlington pair 189' as connected to the base electrode 198b of the second Darlington transistor 198. The second Darlington transistor emitter electrode 198c is connected to power supply output 139c'. Power supply 139' operates in manner similar to the hereinabove described operation of power supply 139, with diode 185 being forward biased during each positive source waveform half-cycle, whereby current source 199 supplies a current, to the Darlington pair base electrode 197b, of magnitudes sufficient to saturate both Darlington transistors and cause rapid charging of capacitance 193. The value of capacitance 193 is determined by the allowable power supply ripple voltage, in accordance with the formula $C = V_r(I/F)$, where C is the value of capacitance 193 in farads, Vr is the allowable ripple voltage, I is the current drawn from the output of power supply 139', and F is the power line frequency (60 Hz). Charging of capacitance 193 continues until a voltage, set by the zener voltage of diode 195, is reached, whereupon SCR 191 is triggered and base drive is removed from the Darlington transistor pair 189', causing charging of capacitance 193 to terminate. The SCR returns to the nonconductive condition at the end of the positive half-cycle. Again, it should be understood that, while a positive voltage supply is shown, a negative operating potential supply may be equally as well implemented by reversing polarity of all semiconductive components, including diodes 185, 199a, 199b, and 195, transistors 197, 198 and 200 and SCR 191.

There has just been described a system for remotely controlling the switching on and off, as well as controlling the magnitude, of power applied to each of at least one power-consuming loads remotely located from a central facility. Several presently preferred embodiments of programmable load control and switching means, for use at each remote location, and power supply means for providing operating potential to the load control and switching means are also disclosed.

While many variations and modifications will now occur to those skilled in the art, it is our intent, therefore, that we be limited only by the scope of the appending claims and not by the specific details presented herein.

What is claimed is:

1. A system for remotely controlling both the application and magnitude-of-consumption of power to at least one load from an A.C. source, comprising:
   a transmission medium;
   at least one means for transmitting power-consumption information via said medium;
   at least one means for receiving the transmitted power-consumption information;
   at least one means associated with each receiving means for providing a control signal having a variable characteristic responsive to the received information; and
   load control and switching means associated with each control signal providing means for connecting and disconnecting the associated one of said at least one load to said source for a portion of each cycle of the source A.C. waveform, the magnitude of said portion being established by said control signal variable characteristic and controlling the magnitude of power consumed by said at least one load; said load control switching means including a gateable bidirectional-conducting element having a gate input and a main circuit, connected between said source and said load, controlled to conduct responsive to a gating signal at said gate input; a trigger element having a first terminal connected to said gate input for providing said gating signal thereto responsive to a voltage of predetermined magnitude at a trigger element second terminal; an energy-storage element connected between said trigger element second terminal and said load; and a silicon controlled rectifier (SCR) having a cathode electrode, a gate electrode and an anode electrode connected to the junction between the energy storage element and trigger element second terminal; one of said cathode and gate electrodes receiving said control signal and the other of said cathode and gate electrodes being coupled to that side of said gateable element main circuit not coupled to said energy-storage element.

2. The apparatus as set forth in claim 1, wherein said load control and switching means requires a control signal with said variable characteristic being a variable D.C. analog voltage for control of load connection and average power consumption, said receiving means providing said power-consumption information as a digital signal; and wherein said control signal providing means is a digital-to-analog converter.

3. The apparatus as set forth in claim 1, wherein said load control and switching means requires a control signal with said variable characteristic being a variable pulse-width periodic signal for control of load connection and average power consumption; said receiving means providing said power-consumption information as a digital signal; and wherein said control signal providing means is a pulse-width-modulated signal generator providing a periodic waveform having a pulse of width established by the digital information from said receiving means.

4. The apparatus as set forth in claim 1, wherein said transmitting means are at at least one location remote from the location of said at least one receiving means; each transmitting means including means for transmitting the address of a location at which said load power-consumption information is to be acted upon; and each of said receiving means further comprising: means for setting a local address; and means for enabling the associated control signal providing means only if said local address corresponds to an address transmitted by one of said transmitting means.

5. The apparatus of claim 1, further comprising means coupled to said control signal providing means for manually controlling the variable characteristic of said control signal to control both the switching on and off and the magnitude of power consumed by said load from said source.

6. The apparatus of claims 1 or 5, wherein each of said at least one load is an incandescent lighting source.

7. The apparatus of claim 1, further comprising a radio-frequency-interference filter effectively in series connection with said gateable element main circuit.

8. The apparatus of claim 1, wherein said SCR gate electrode is connected to said gateable element main circuit and said cathode electrode receives said control signal.

9. The apparatus of claim 1, further comprising a source of operating potential connected to said SCR gate electrode; a transistor device having an input electrode receiving said control signal and a switchable circuit controlled by the signal at said input electrode; a first resistance element in series with said transistor device switchable control circuit, between said SCR cathode electrode and that side of said gateable element main circuit not coupled to said energy-storage element; and a second resistance element in series between SCR anode and the junction of said trigger element and said energy-storage element.

10. The apparatus of claim 1, wherein said gateable device is a triac, and said trigger element is a diac.

11. The apparatus of claim 1, wherein said energy storage element is an electrical capacitance.

12. A circuit for controlling both the application and magnitude of a current flow from an A.C. source to a load, responsive to a variable characteristic of an externally-provided control signal, comprising:

first and second terminals each adapted for connection to a different one of said source and said load;
a gateable, bidirectionally-conducting element having a gate input and a main circuit, connected between said first and second terminals, controlled to conduct responsive to a gating signal at said gate input;
a trigger element having a first terminal connected to said gate input for providing said gating signal thereto responsive to a voltage of predetermined magnitude at a second trigger element terminal;
an energy-storage element connected between said trigger element second terminal and said circuit second terminal; and
a silicon control rectifier (SCR) having a cathode electrode, a gate electrode and an anode electrode connected to the junction between the energy-storage element and the trigger element second terminal;
one of said SCR cathode and gate electrodes receiving said control signal to cause said gateable element main circuit to conduct, the other of said cathode electrode being coupled to that side of said gateable element main circuit not coupled to said energy-storage element.

13. The circuit of claim 12, further comprising a radio-frequency-interference filter effectively connected in series connection with said gateable element means circuit.

14. The circuit of claim 12, wherein said SCR gate electrode is connected to said gateable element means circuit and said cathode electrode receives said control signal.

15. The circuit of claim 12, further comprising a source of operating potential connected to said SCR gate electrode; a transistor device having an input electrode receiving said control signal and having a switchable circuit controlled by the signal at said input electrode; a first resistance element in series with said transistor device switchable control circuit, between said SCR cathode electrode and that side of said gateable element main circuit not coupled to said energy-storage element; and a second resistance element in series between said SCR anode and the junction of said trigger element and energy-storage element.

16. The circuit of claim 12, wherein said gateable device is a triac, and said trigger element is a diac.

17. The apparatus of claim 12, wherein said energy-storage element is an electrical capacitance.

* * * * *